United States Patent
Keidar

(10) Patent No.: US 9,553,721 B2
(45) Date of Patent: Jan. 24, 2017

(54) SECURE EXECUTION ENVIRONMENT COMMUNICATION

(71) Applicant: QUALCOMM Incorporated, San Diego, CA (US)

(72) Inventor: Ron Keidar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/610,832

(22) Filed: Jan. 30, 2015

(65) Prior Publication Data

US 2016/0226661 A1 Aug. 4, 2016

(51) Int. Cl.
| | | |
|---|---|---|
| *H04L 9/32* | (2006.01) | |
| *H04L 9/08* | (2006.01) | |
| *G06F 21/74* | (2013.01) | |
| *H04L 9/06* | (2006.01) | |
| *H04L 29/06* | (2006.01) | |

(52) U.S. Cl.
CPC ............. *H04L 9/0838* (2013.01); *G06F 21/74* (2013.01); *H04L 9/06* (2013.01); *H04L 9/0618* (2013.01); *H04L 9/0869* (2013.01); *H04L 9/0894* (2013.01); *H04L 9/3231* (2013.01); *H04L 63/0471* (2013.01)

(58) Field of Classification Search
CPC ........ H04L 9/0838; H04L 9/0618; H04L 9/06; H04L 9/0869; H04L 9/0894; H04L 9/3231; H04L 9/0816
See application file for complete search history.

(56) References Cited

U.S. PATENT DOCUMENTS

| | | |
|---|---|---|
| 8,112,625 B2 | 2/2012 | Ginter et al. |
| 8,266,433 B1 | 9/2012 | Przykucki et al. |
| 8,477,946 B2 | 7/2013 | Funk et al. |
| 8,812,871 B2 * | 8/2014 | Monclus ................. G06F 21/53 713/189 |
| 9,037,860 B1 * | 5/2015 | Kerschbaum ....... H04L 63/0428 713/168 |

(Continued)

OTHER PUBLICATIONS

International Search Report and Written Opinion—PCT/US2016/014484—ISA/EPO—Apr. 4, 2016, 10 pgs.

(Continued)

*Primary Examiner* — Krisna Lim
(74) *Attorney, Agent, or Firm* — Hunter Clark PLLC

(57) ABSTRACT

A of a method of securely transferring information between execution environments includes: receiving, at a crypto engine, original plaintext from a first execution environment; obtaining a first cryptographic key by the crypto engine, the first cryptographic key being retained in memory such that the first cryptographic key is associated with the first execution environment and a second execution environment that is not the first execution environment; encrypting the original plaintext by the crypto engine using the first cryptographic key to produce encrypted information, and storing the encrypted information in an intermediate storage location; obtaining, at the crypto engine, the encrypted information from the intermediate storage location; decrypting the encrypted information by the crypto engine using the first cryptographic key to produce reconstituted plaintext; and making the reconstituted plaintext available to the second execution environment by the crypto engine.

31 Claims, 5 Drawing Sheets

(56) References Cited

U.S. PATENT DOCUMENTS

| | | | |
|---|---|---|---|
| 2010/0329454 A1* | 12/2010 | Takashima | H04L 9/3073 |
| | | | 380/44 |
| 2013/0085880 A1 | 4/2013 | Roth et al. | |
| 2013/0339252 A1* | 12/2013 | Pauker | H04L 9/06 |
| | | | 705/71 |
| 2014/0122865 A1 | 5/2014 | Ovsiannikov | |

OTHER PUBLICATIONS

LV, C., MA, M., LI, H., MA, J., & Zhang, Y. (Apr. 26, 2013). An novel three-party authenticated key exchange protocol using one-time key. Journal of Network and Computer Applications, 36, 498-503. Elsevier.

* cited by examiner

| Key | Key owner identifier (Sending EE; Source EE) | Authorized key user identifier(s) (Receiving EE(s); Destination EE(s)) |
|---|---|---|
| Key 1 | EE1 | EE3 |
| Key 2 | EE1 | EE2, EE3, EE6 |
| Key 3 | EE3 | EE1 |
| Key 4 | EE2 | EE1 |
| Key 5 | EE6 | EE1 |
| Key 6 | EE6 | |

FIG. 4

SECURE EXECUTION ENVIRONMENT COMMUNICATION

BACKGROUND

Distributed computing systems are becoming more prevalent as the demand for processing capacity increases. Various forms of distributed computing systems exist, such as portions of processing capacity of multiple computers being allocated for a common task. Distributed computing systems may comprise different physical processors, portions of different physical processors, multiple operating systems resident on multiple processors, multiple operating systems resident on a single processor, combinations of two or more of any of these, or still other configurations. For example, different sensors, which may or may not include their own processors including processing algorithms, may be used to provide many different types of information, e.g., eye or retina scanning for identification, voice recognition for identification, heartbeat detection, respiration detection, gesture detection, fingerprint recognition, etc.

In many cases of distributed computing systems, it may be desirable or even necessary for different execution environments to communicate securely with each other. While in previous, centralized systems, secure communication was easily managed, providing secure communications in distributed systems, even if those systems are in a single device, is more challenging. One way to provide secure communication is to establish a secure channel between execution environments (i.e., between one or more processors, and/or one or more operating systems, and/or one or more virtual machines, etc., or combinations of any of these). Establishing a secure channel between execution environments traditionally has been cumbersome, using significant design effort, and sometimes key provisioning and secure storage. For example, each execution environment may have a public key and use this key to encrypt information that is then transferred to another execution environment for decryption using a private key. For example, using Secure Sockets Layer (SSL) cryptographic protocol, the execution environments exchange certificates (using certificate authorities and a public key infrastructure) to establish a session key. This protocol involves complex key provisioning of many keys to many entities. Alternatively, a shared memory may be established for each pair of execution environments that are to exchange information. This entails dedicating expensive memory resources to each pair, inhibiting scalability, and may also use memory management that is complex and costly. Further, a memory manager may access the information and/or may remove protection on the information.

SUMMARY

An example of a method of securely transferring information between execution environments includes: receiving, at a crypto engine, original plaintext from a first execution environment; obtaining a first cryptographic key by the crypto engine, the first cryptographic key being retained in memory such that the first cryptographic key is associated with the first execution environment and a second execution environment that is not the first execution environment; encrypting the original plaintext by the crypto engine using the first cryptographic key to produce encrypted information, and storing the encrypted information in an intermediate storage location; obtaining, at the crypto engine, the encrypted information from the intermediate storage location; decrypting the encrypted information by the crypto engine using the first cryptographic key to produce reconstituted plaintext; and making the reconstituted plaintext available to the second execution environment by the crypto engine.

Implementations of such a method may include one or more of the following features. The method further includes: receiving, from the first execution environment by the crypto engine, a destination indication associated with the plaintext, the destination indication indicating the second execution environment; and receiving, from the second execution environment by the crypto engine, a source indication associated with the encrypted information, the source indication indicating the first execution environment. The method further includes: receiving the first cryptographic key from the first execution environment at the crypto engine; receiving a first usage indication from the first execution environment at the crypto engine indicating that the first cryptographic key may be used in decrypting ciphertext from the second execution environment; and writing the first cryptographic key to the memory by the crypto engine. The first usage indication indicates that the first cryptographic key may be used in decrypting ciphertext from the second execution environment if a source of the ciphertext is the first execution environment. The writing comprises writing the first cryptographic key into the memory with a first indication of the first execution environment and a second indication of the second execution environment. The method further includes receiving another usage indication from the first execution environment at the crypto engine indicating that the first cryptographic key may be used in decrypting ciphertext from a third execution environment, where the third execution environment is not the first execution environment or the second execution environment, and where the writing comprises writing the first cryptographic key with a third indication of the third execution environment. Receiving the first cryptographic key from the first execution environment at the crypto engine includes receiving the first cryptographic key over a link that the crypto engine trusts to provide information only from the first execution environment. The method further includes: receiving a second cryptographic key from the second execution environment at the crypto engine; receiving a second usage indication from the second execution environment at the crypto engine indicating that the second cryptographic key may be used in decrypting ciphertext from the first execution environment; writing the second cryptographic key to the memory by the crypto engine; and using the first and second cryptographic keys for at least one of: authenticating each of the first and second execution environments by the other of the first and second execution environments; or generating a common session key. The using comprises authenticating each of the first and second execution environments, and authenticating the second execution environment by the first execution environment comprises: receiving a first plaintext authenticator at the crypto engine from the first execution environment; encrypting, by the crypto engine, the first plaintext authenticator using the first cryptographic key to produce a first ciphertext authenticator; receiving, at the crypto engine, the first ciphertext authenticator from the second execution environment; decrypting, at the crypto engine, the first ciphertext authenticator using the first cryptographic key to produce a first reconstituted plaintext authenticator; encrypting, at the crypto engine, the first reconstituted plaintext authenticator using the second cryptographic key to produce a second ciphertext authenticator; receiving, at the crypto engine, the second ciphertext authenticator from the first execution environment; decrypting, at the crypto engine, the second ciphertext authenticator using the second cryptographic key to produce a second reconstituted plaintext authenticator; and making the second reconstituted plaintext authenticator available to the first execution environment by the crypto engine. The further includes generating a random number and using the random number as the first plaintext authenticator. The method further includes: receiving the first cryptographic key from the first execution environment at the crypto engine; and receiving a second cryptographic key from the second execution environment at the crypto engine; where encrypting the original plaintext by the crypto engine includes using the first cryptographic key and the second cryptographic key to produce the encrypted information.

An example of a crypto engine includes: a memory module; and a processor module communicatively coupled to the memory module and configured to: receive original plaintext from a first execution environment; obtain a first cryptographic key from the memory module, the first cryptographic key being stored by the memory module such that the first cryptographic key is associated with the first execution environment and a second execution environment that is not the first execution environment; encrypt the original plaintext using the first cryptographic key to produce encrypted information and store the encrypted information in an intermediate storage location; obtain the encrypted information from the intermediate storage location; decrypt the encrypted information using the first cryptographic key to produce reconstituted plaintext; and make the reconstituted plaintext available to the second execution environment.

Implementations of such a crypto engine may include one or more of the following features. The processor module is further configured to: receive, from the first execution environment, a destination indication associated with the plaintext, the destination indication indicating the second execution environment; and receive, from the second execution environment, a source indication associated with the encrypted information, the source indication indicating the first execution environment; where the processor module is configured to encrypt the original plaintext using the first cryptographic key based on receiving the destination indication indicating the second execution environment; and where the processor module is configured to decrypt the encrypted information using the first cryptographic key based on receiving the source indication indicating the first execution environment. The processor module is further configured to: receive the first cryptographic key from the first execution environment at a first port that the processor module associates with the first execution environment; receive a first usage indication from the first execution environment indicating that the first cryptographic key may be used in decrypting ciphertext from the second execution environment; and store the first cryptographic key in the memory such that the first cryptographic key is associated with the first execution environment and the second execution environment based on receiving the first cryptographic key and the first usage indication. The processor module is configured to store the first cryptographic key in the memory with a first indication of the first execution environment and a second indication of the second execution environment. The processor module is further configured to receive another usage indication from the first execution environment at the crypto engine indicating that the first cryptographic key may be used in decrypting ciphertext from a third execution environment, where the third execution environment is not the first execution environment or the second execution environment, and where the processor module is further configured to store the first cryptographic key with a third indication of the third execution environment. The processor module is further configured to: receive a second cryptographic key from the second execution environment at a second port that the processor module associates with the second execution environment; receive a second usage indication from the second execution environment indicating that the second cryptographic key may be used in decrypting ciphertext from the first execution environment; and store the second cryptographic key in the memory in association with the second usage indication. The processor module is further configured to: receive the first cryptographic key from the first execution environment; receive the first cryptographic key from the first execution environment; encrypt the original plaintext using the first cryptographic key and the second cryptographic key to produce the encrypted information.

Another example of a crypto engine includes: means for receiving original plaintext from a first execution environment; first obtaining means for obtaining a first cryptographic key from memory, the first cryptographic key being associated with the first execution environment and a second execution environment that is not the first execution environment; means for encrypting the original plaintext using the first cryptographic key to produce encrypted information and for storing the encrypted information in an intermediate storage location; second obtaining means for obtaining the encrypted information from the intermediate storage location; means for decrypting the encrypted information using the first cryptographic key to produce reconstituted plaintext; and means for making the reconstituted plaintext available to the second execution environment.

Implementations of such a crypto engine may include one or more of the following features. The means for receiving are further for receiving, from the first execution environment, a destination indication associated with the plaintext, the destination indication indicating the second execution environment, the second obtaining means are further for receiving, from the second execution environment, a source indication associated with the encrypted information, the source indication indicating the first execution environment, the means for encrypting are for encrypting the original plaintext using the first cryptographic key based on receiving the destination indication indicating the second execution environment, and the means for decrypting are for decrypting the encrypted information using the first cryptographic key based on receiving the source indication indicating the first execution environment. The means for receiving are further for receiving the first cryptographic key from the first execution environment at a first port associated with the first execution environment and receiving a first usage indication from the first execution environment indicating that the first cryptographic key may be used in decrypting ciphertext from the second execution environment, the crypto engine further comprising means for storing the first cryptographic key in the memory such that the first cryptographic key is associated with the first execution environment and the second execution environment based on receiving the first cryptographic key and the first usage indication. The means for storing are configured to store the first cryptographic key in the memory with a first indication of the first execution environment and a second indication of the second execution environment. The means for receiving are further for receiving another usage indication from the first execution environment at the crypto engine indicating that the first cryptographic key may be used in decrypting ciphertext from a third execution environment, where the third execution environment is not the first execution environment or the second execution environment, and where the means for storing are configured to store the first cryptographic key with a third indication of the third execution environment. The second obtaining means are further for: receiving a second cryptographic key from the second execution environment at a second port associated with the second execution environment; and receiving a second usage indication from the second execution environment indicating that the second cryptographic key may be used in decrypting ciphertext from the first execution environment, where the means for storing are further for storing the second cryptographic key in the memory in association with the second usage indication.

An example of a non-transitory processor-readable storage medium includes processor-readable instructions configured to cause a processor to: receive original plaintext from a first execution environment; obtain a first cryptographic key from memory, the first cryptographic key being associated with the first execution environment and a second execution environment that is not the first execution environment; encrypt the original plaintext using the first cryptographic key to produce encrypted information and store the encrypted information in an intermediate storage location; obtain the encrypted information from the intermediate storage location; decrypt the encrypted information using the first cryptographic key to produce reconstituted plaintext; and make the reconstituted plaintext available to the second execution environment. Implementations of such a storage medium may include one or more of the following features. The storage medium further includes instructions configured to cause the processor to: receive, from the first execution environment, a destination indication associated with the plaintext, the destination indication indicating the second execution environment; and receive, from the second execution environment, a source indication associated with the encrypted information, the source indication indicating the first execution environment; where the instructions configured to cause the processor to encrypt are configured to cause the processor to encrypt the original plaintext using the first cryptographic key based on receiving the destination indication indicating the second execution environment; and where the instructions configured to cause the processor to decrypt are configured to cause the processor to decrypt the encrypted information using the first cryptographic key based on receiving the source indication indicating the first execution environment. The storage medium further includes instructions for causing the processor to: receive the first cryptographic key from the first execution environment; receive a first usage indication from the first execution environment indicating that the first cryptographic key may be used in decrypting ciphertext from the second execution environment; and store the first cryptographic key in the memory such that the first cryptographic key is associated with the first execution environment and the second execution environment based on receiving the first cryptographic key and the first usage indication. The instructions configured to cause the processor to store are configured to cause the processor to store the first cryptographic key in the memory with a first indication of the first execution environment and a second indication of the second execution environment. The storage medium further includes instructions configured to cause the processor to receive another usage indication from the first execution environment at the crypto engine indicating that the first cryptographic key may be used in decrypting ciphertext from a third execution environment, where the third execution environment is not the first execution environment or the second execution environment, and where the instructions configured to cause the processor to store are configured to cause the processor to store the first cryptographic key with a third indication of the third execution environment. The storage medium further including instructions configured to cause the processor to: receive a second cryptographic key from the second execution environment; receive a second usage indication from the second execution environment indicating that the second cryptographic key may be used in decrypting ciphertext from the first execution environment; and store the second cryptographic key in the memory with indications that the second cryptographic key may be used to encrypt plaintext from the second execution environment and that the second cryptographic key may be used to decrypt ciphertext from the first execution environment.

Items and/or techniques described herein may provide one or more of the following capabilities, and/or other capabilities not mentioned. Secure tunnels may be provided without exchanging certificates between ends of the tunnels. Entities using a secure tunnel may authenticate each other, e.g., without using a certificate manager or exchanging certificates. Ad hoc tunnels for secure communication may be established. Tunnels for secure information exchange may be established between a single information source and multiple destinations using a single cryptographic key. Other capabilities may be provided and not every implementation according to the disclosure must provide any, let alone all, of the capabilities discussed.

BRIEF DESCRIPTION OF THE DRAWINGS

FIG. 4 is a portion of a key table in key storage shown in FIG. 3.

DETAILED DESCRIPTION

Figure 1:
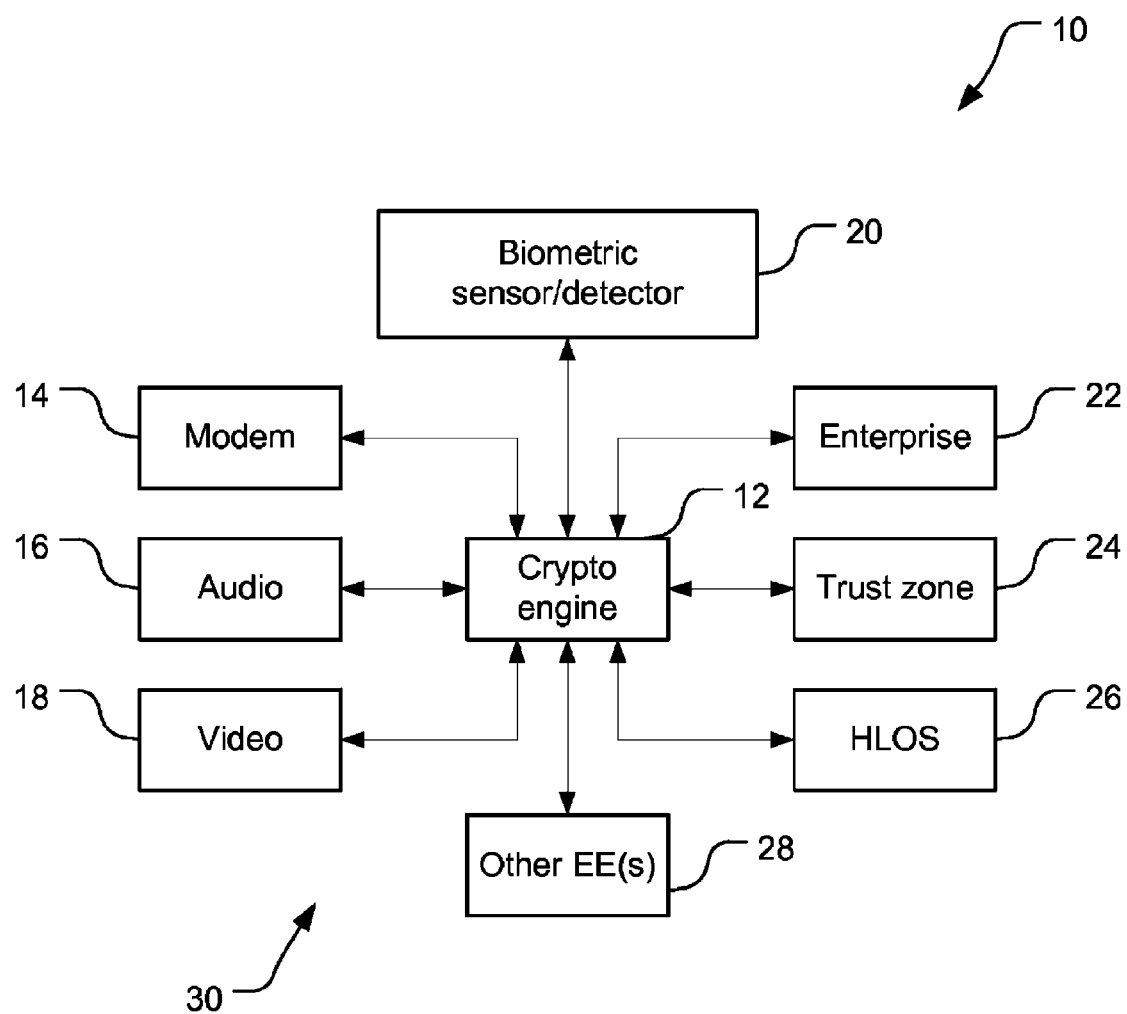
FIG. 1 is a block diagram of a distributed computing system.

Techniques are discussed for providing secure communications. For example, secure communications between execution environments of a distributed computing system may be provided without using a shared memory (a memory with locations that are accessible by multiple execution environments) and without exchanging certificates between the execution environments. A crypto engine can securely identify users of the crypto engine, e.g., execution environments wanting information encrypted or decrypted, with the users securely identified, e.g., with hardware identities or machine identities delivered by hardware that is immutable by the execution environments. A sending execution environment may provide a cryptographic key to a crypto engine such that the sending execution environment is identified, e.g., by the cryptographic key being sent over a trusted communication link, and the crypto engine may store the cryptographic key associated with the sending execution environment. The sending execution environment may indicate a receiving execution environment that may use the cryptographic key to decrypt messages from the sending execution environment. The cryptographic key may be stored by the crypto engine in association with the sending execution environment and the receiving execution environment, e.g., in association with identifiers of these execution environments. The sending execution environment may provide the crypto engine with a plaintext message with an indication that the receiving execution environment is the intended recipient (this indication may be, e.g., an indication of a particular key for which the intended recipient is a permitted user). The crypto engine may encrypt the plaintext message using the cryptographic key that is provided by the sending execution environment and that is designated for access and/or use by the receiving execution environment. The encrypted plaintext message is then an encrypted message, i.e., a ciphertext message, and may be provided to the receiving execution environment through an untrusted broker, like a high-level operating system, that can move the message but cannot decipher the message as the broker cannot use the cryptographic key. The ciphertext is representative of the plaintext, and thus may be representative of text and/or non-text information such as pictures, video, etc. The receiving execution environment may provide the received ciphertext message to the crypto engine with an indication of the source of the ciphertext message (this indication may be, e.g., an indication of a particular key for which the source is the owner). The crypto engine may decrypt the ciphertext message, to produce a reconstituted plaintext message, using the cryptographic key that was provided by the sending execution environment and that was designated for access or use by the receiving execution environment. The crypto engine may provide the reconstituted plaintext message to the receiving execution environment. Other techniques may be used including, but not limited to, techniques discussed below.

Referring to FIG. 1, a distributed computing system 10 includes an encryption/decryption engine, i.e., a crypto engine, 12, and several execution environments (EEs) 30 including a modem 14, an audio EE 16, a video EE 18, a sensor/detector EE 20, an enterprise EE 22, a trust zone EE 24, a high-level operating system (HLOS) EE 26, and one or more other execution environments 28. The other EE(s) 28 may include one or more EEs similar to the EEs shown, e.g., may include another sensor/detector EE, another video EE, etc. The sensor/detector EE 20 may be any of a variety of sensors such as a camera, a Satellite Positioning System (SPS) receiver (e.g., a Global Positioning System (GPS) receiver), a microphone, or a biometric sensor, etc. A biometric sensor may be any of a variety of sensors such as a fingerprint sensor, an electrocardiogram (ECG) sensor, an electroencephalogram (EEG) sensor, etc. For simplicity, the "EE" is omitted from the boxes in the figures. Further, the execution environments may be referred to as modules. Each of the execution environments 30 may be implemented by hardware, firmware, one or more processors, or a combination of any of these. Multiple processors may be used to implement the execution environments, with each execution environment being implemented by one or more processors, or with one or more groups of the execution environments 30 (i.e., two or more execution environments per group) each being implemented by a single processor. Where a single processor implements multiple ones of the execution environments 30 (possibly all of the execution environments 30), the execution environments 30 are distinct operating systems implemented by the processor. The execution environments 30 may be referred to as operating systems or virtual machines. The execution environments 30 are modules that process respective information and that may share information between them in a confidential manner. The execution environments 30 shown are examples of execution environments and other execution environments may be provided, and/or one or more of the execution environments 14, 16, 18, 20, 22, 24, 26, 28 may be omitted from the system 10. The system 10 may be used for a variety of purposes and the techniques described herein are applicable to any of a wide variety of applications of the system 10 in order to pass information between execution environments securely.

Figure 2:
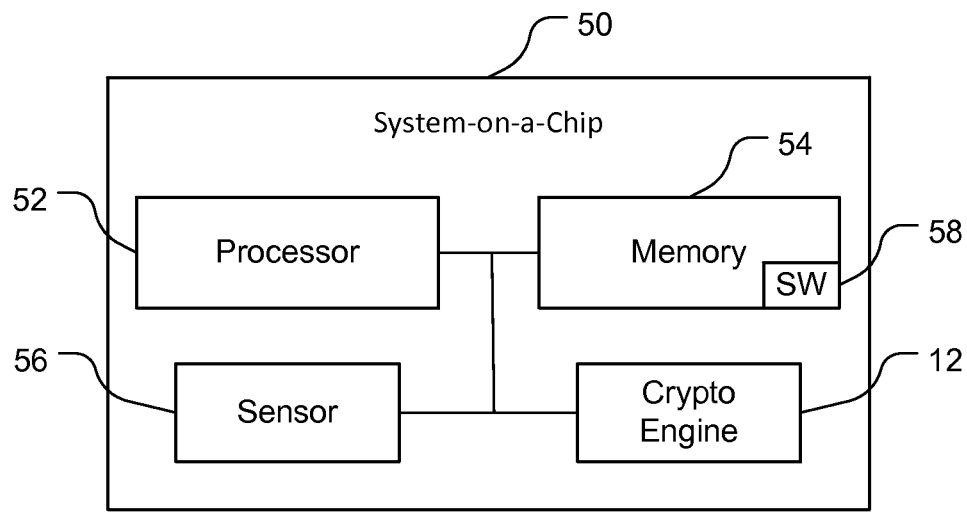
FIG. 2 is a block diagram of a system on a chip for implementing the system shown in FIG. 1.

Referring also to FIG. 2, a System-on-a-Chip (SoC) 50 for implementing the system 10 shown in FIG. 1 includes a processor 52, memory 54, a sensor 56, and the crypto engine 12. The processor 52 may include more than one processor and the sensor 56 may include more than one sensor. The sensor 56 is optional and may be omitted, e.g., if there is no audio, video, biometric, or other information to be sensed (e.g., measured). Further, the sensor 56 (e.g., or one or more sensors if the sensor 56 include more than one sensor) may be disposed externally to (i.e., off) the SoC 50. The processor 52 is preferably an intelligent hardware device, for example a central processing unit (CPU) such as those made or designed by ARM®, Intel® Corporation, or AMD®, a microcontroller, an application specific integrated circuit (ASIC), etc. The processor 52 may comprise multiple separate physical entities that can be distributed in the SoC 50. The memory 54 includes random access memory (RAM) and read-only memory (ROM). The memory 54 is a non-transitory, processor-readable storage medium that stores software 58 which is processor-readable, processor-executable software code containing instructions that are configured to, when executed, cause the processor 52 to perform various functions described herein (although the description may refer only to the processor 52 performing the functions). Alternatively, the software 58 may not be directly executable by the processor 52 but configured to cause the processor 52, for example when compiled and executed, to perform the functions. The processor 52 is communicatively coupled to the memory 54. The crypto engine 12 is a hardware block configured to store cryptographic keys, encrypt plaintext into ciphertext, store ciphertext, decrypt ciphertext into reconstituted plaintext, and store the reconstituted plaintext, all as more fully discussed below.

The processor 52 in conjunction with the memory 54, and the sensor 56 as appropriate, are configured to implement the execution environments 30. Any of the execution environments 30 may have its own processor. The memory 54 may be a collection of memories including one or more memories for each of the execution environments 30. Further, while shown in FIG. 2 as part of the SoC 50, the memory 54 may be disposed partially or wholly outside of the SoC 50, e.g., on top of the SoC 50 in a package-on-package (PoP) configuration.

The memory 54 may include a joint memory that is used by multiple ones of the execution environments 30. This joint memory may not be a shared memory, i.e., different execution environments 30 may not be able to access the same memory location such that multiple execution environments 30 would not be able to write to a single memory location, and one execution environment 30 would not be able to write to a memory location with another of the execution environments 30 able to read that memory location. Thus, an indication that an execution environment 30 receives information or provides information may be equivalent to, and may be implemented by, that information being read from the joint memory by the execution environment 30 or provided to the joint memory by the execution environment 30. The joint memory may include a memory management unit for controlling access to its memory locations, e.g., for storing information to and/or reading information from the memory locations.

The execution environments 30 are operating systems or virtual machines that process a variety of information, for example to provide audio, video, biometric, and/or other information. Each of the execution environments 30 may be communicatively coupled to the crypto engine 12 to provide information to the crypto engine 12 in a manner such that the crypto engine 12 can securely identify the source of the information. For example, the crypto engine 12 can readily identify the owner or source of information based upon a hardware signal or identifier that securely and immutably identifies the execution environment 30 providing information, or by identifying a private link or port through which information comes to the crypto engine 12 from a respective one of the execution environments 30. The execution environments 30 may provide information, including cryptographic keys, to or receive information from the crypto engine 12, or may provide commands to have the crypto engine 12 encrypt or decrypt information indicated by the execution environments 30. Preferably, the execution environments cannot receive cryptographic keys from the crypto engine 12.

Figure 3:
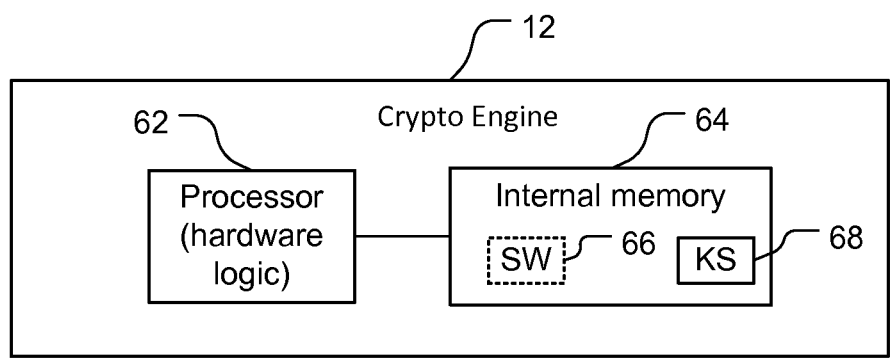
FIG. 3 is a block diagram of a crypto engine shown in FIG. 1.

Referring to FIG. 3, with further reference to FIGS. 1-2, the crypto engine 12 comprises a computer system including a processor 62 an internal memory 64 including software (SW) 66 (optionally) and a key storage (KS) 68. The internal memory 64 is not accessible by the execution environments 30. The processor 62 is preferably an intelligent hardware logic device configured to encrypt plaintext into ciphertext and to decrypt ciphertext into plaintext. The processor 62 may alternatively comprise a processor and software stored in processor-readable memory in order to implement encryption and/or decryption functionality. Thus, for example, the processor 62 may comprise a central processing unit (CPU) such as those made or designed by ARM®, Intel® Corporation, or AMD®, a microcontroller, an application specific integrated circuit (ASIC), etc. The processor 62 may comprise multiple separate physical entities that can be distributed in the crypto engine 12. The memory 64 may include random access memory (RAM) and read-only memory (ROM). If the software 66 is included, then the memory 64 storing the software 66 is a non-transitory, processor-readable storage medium and the software 66 is processor-readable, processor-executable software code containing instructions that are configured to, when executed, cause the processor 62 to perform various functions described herein (although the description may refer only to the processor 62 performing the functions). Alternatively, the software 66 may not be directly executable by the processor 62 but configured to, for example when compiled and executed, cause the processor 62 to perform the functions. The processor 62 is communicatively coupled to the memory 64, e.g., to access cryptographic keys stored in the key storage 68. The processor 62 either alone, or in combination with the memory 64, provides means for performing functions as described herein, for example, receiving plaintext (unencrypted information) or ciphertext (encrypted information) from execution environments 30, verifying that a requesting execution environment 30 is allowed to use a requested cryptographic key (e.g., to have the processor 62 use the key on the requesting execution environment's behalf), encrypting plaintext, decrypting ciphertext, and providing ciphertext or plaintext to the execution environments 30. The processor 62 is configured to associate incoming information with sources of the information as discussed below, and may include a transceiver processing unit for doing so.

The processor 62 includes a memory interface for communicating with the memory 54 to retrieve information (e.g., ciphertext or plaintext) from, and store information (e.g., ciphertext or plaintext) to, locations in the memory 54, e.g., using direct memory accesses. The processor 62 further includes a command interface to communicate with the execution environments 30 to receive commands from the execution environments 30, such as a command including indications of plaintext to be encrypted and a key to be used to encrypt the plaintext, or indications of ciphertext to be decrypted and a key to be used to decrypt the ciphertext to produce reconstituted plaintext. The indications of plaintext or ciphertext may be indications of locations in the memory 54 where the plaintext or ciphertext is stored. A command may further include one or more indications of one or more destinations of encrypted ciphertext or reconstituted plaintext. An indication of a destination may be an indication of an execution environment 30 and/or an indication of a location in the memory 54 associated with a corresponding execution environment 30.

The memory 64 includes a command interface for receiving commands from the execution environments 30, such as a command including an indication of a cryptographic key, an indication of the requesting execution environment 30, and/or one or more indications of one or more authorized users of the cryptographic key (with such an indication possibly being an indication of the requesting execution environment 30). Such a command may be for writing a cryptographic key or requesting use of a cryptographic key for encrypting plaintext or decrypting ciphertext. The processor 62 is configured to store and access cryptographic keys to and from the memory 64 as discussed below.

The key storage 68 is a portion of the internal memory 64 of the crypto engine 12 that stores cryptographic keys provided by the execution environments 30 for use in encrypting and decrypting messages from the encryption environments 30. The cryptographic keys in the key storage 68 are stored by the processor 62 in association with the execution environment 30 that wrote or provided the cryptographic key and at least one other of the execution environments 30. That is, each cryptographic key in the key storage 68 is associated with both a sending execution environment and a receiving execution environment. The sending execution environment controls/requests encryption and sending of a message and the receiving execution environment that receives and controls/requests decryption of the message. The key storage 68 stores the keys so that the processor 62 can determine the appropriate key to use for encrypting or decrypting information based on the execution environment that wrote the key and/or the execution environment looking to use the key. The key storage 68 stores cryptographic keys so that the processor 62 can locate the appropriate cryptographic key once the processor 62 is provided with the source of the key and the approved user or users of the key. That is, if the processor 62 knows the execution environment 30 requesting use of the key, and the author of the key if different from the requesting execution environment 30, then the processor 62 may locate the appropriate key in the key storage 68. The processor 62 knows, i.e., is provided with information as to, the source of the key (the author of the key, i.e., the execution environment 30 that wrote the key) and the would-be user of the key.

A single cryptographic key may be associated with more than one authorized key user, i.e., more than one receiving execution environment. Thus, the processor 62 may use information as to not only the user of the key and the author of the key, but any other potential users of the key, in order to locate the appropriate key in the key storage 68. For example, referring also to FIG. 1, the processor 62 may permit a key written by the audio EE 16 for use in communicating messages from the audio EE 16 to the video EE 18 and the trust zone EE 24 to be used by the trust zone EE 24 to decrypt messages sent from the audio EE 16 to both the video EE 18 and the trust zone EE 24, but not messages from the audio EE 16 only to the trust zone EE 24. For example, an index may indicate the authorized user(s) of a particular key and the processor 62 may authorize use of the particular key to a requesting (calling) execution environment 30 only if an allowed list of execution environments 30 for the particular key includes the requesting execution environment 30.

The key storage 68 may take a variety of forms. For example, keys may be stored in the key storage 68 with their storage locations being indicative of at least the author of the key. For example, all keys stored in a particular area, e.g., a particular column (or row) of a table, may be keys that have been authored by a single particular execution environment. As another example, keys may be stored in a table such that the row and column of the key are indicative of the author and an authorized user of the key. In this case, for example, a key stored in the second row, and fourth column of the table, may be indicative of a key that was written by an execution environment assigned to the second row and is available for use by an execution environment assigned to the fourth column. In such a case, a single key may be stored multiple times in the table, e.g., if the key is available for use by multiple execution environments. As yet another example, indications may be stored in association with a key that are indicative of the source and the one or more execution environments authorized to use the key for decryption. This example is discussed more fully below with respect to FIG. 4. Further, a statement that keys are stored in a particular area or in a table does not require that the keys are physically group and stored together or in a physically organized format. The organization of the stored keys may be through information, with the keys and associated information potentially storage at physically separate locations. Thus, the groupings of areas are figurative and not necessarily physically literal. Thus, for example, information that is stored in a table may have information that links different pieces of information together to form a single entry, although the information forming a single entry may be disposed at physically separate locations within the memory.

Referring also to FIG. 4, the key storage 68 is a key table 70. The key table 70 includes multiple cryptographic key entries 72, with each of the cryptographic key entries 72 including an encryption/decryption key 74, a key owner identifier 76, and one or more authorized key user identifiers 78. The key owner identifier 76 corresponds to the key owner of the key 74, and the authorized key user identifier(s) 78 corresponds to the authorized user(s) of the key 74. The key owner may also be referred to as a sending execution environment or a source execution environment, while the authorized key user(s) may also be referred to as the receiving execution environment(s) or the destination execution environment(s). Each of the entries 72 include the actual cryptographic key 74, as well as an indication of the key owner, i.e., the key owner identifier 76, as well as one or more indications of the one or more authorized key user(s), i.e., the authorized key user identifier(s) 78, that are authorized to use the corresponding key 74, e.g., for decryption of messages from the key owner.

In the example shown, the table 70 is for a system with six execution environments with shorthand labels of EE1-EE6, and with five stored cryptographic keys 74 labeled Key 1, Key 2, Key 3, Key 4, Key 5. In this example, and as may be employed in other instances, there are fewer keys 74 than there are execution environments 30. There may be one or more execution environments 30 that do not write any keys 74 into the table 70, e.g., if the execution environment 30 will not be sending information securely to another execution environment 30. Alternatively, the table 70 may include more cryptographic keys 74 than there are execution environments 30 in the system, e.g., where one or more of the execution environments 30 stores more than one cryptographic key 74. This may be the case where one execution environment 30 desires to have different secure communications, e.g., a first secure communication between itself and one of the other execution environments 30, and a second secure communication between itself and another one of the execution environments 30, and/or between itself and one or more of the execution environments 30 that may or may not include the execution environment 30 of the first secure communication.

The key entries 72 each include the key 74 and indications of the key owner and the authorized key user(s) of the corresponding key 74. The key owner may automatically be an authorized key user (as is the case with the table 70), and thus may or may not be listed in the key user identifiers 78, or may not automatically be an authorized key user, and thus listed in the key user identifiers 78 if the key owner is an authorized user. In the example shown in FIG. 4, the cryptographic key entry 80 includes a cryptographic key 74, Key 1, whose key owner is an execution environment EE1, with a designated authorized key user of EE3. Similarly, the cryptographic key entry 82 and includes a cryptographic key 74, Key 2, whose key owner is the execution environment EE1, with designated authorized key users of EE2, EE3, and EE6. The key entry 84 has only the key owner, EE6, as an authorized key user. The description herein may refer to the key only with the key owner identifier and the key user identifier being implicit, that is, included within the term "key." Further, reference to one or more of the keys 74 does not require that the key be stored in the table 70 or similar arrangement, or that the key take a particular form.

Figure 5:
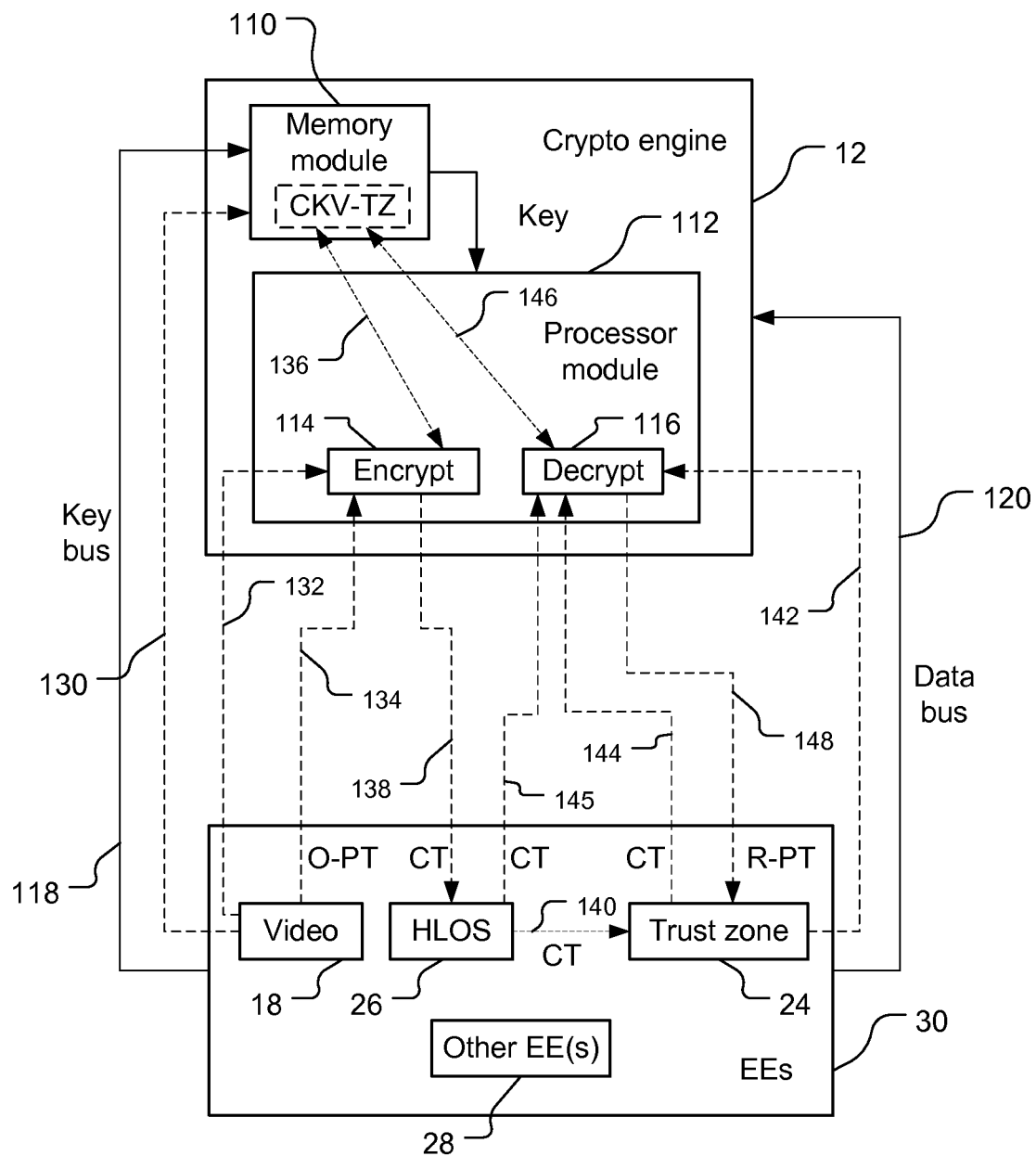
FIG. 5 is a block diagram of an example implementation of the system shown in FIG. 1.

Referring to FIG. 5, with further reference to FIGS. 1-4, the crypto engine 12 and the execution environments 30 are configured to communicate with each other and securely to pass information to each other. The processor 62 and the memory 64 of the crypto engine 12 are configured to implement a memory module 110 and a processor (or engine) module 112, including the various means for performing functions discussed herein. The memory module 110 and the engine module 112 are configured to, as appropriate, communicate with each other, receive and store cryptographic keys, use the cryptographic keys to encrypt and decrypt data, and provide the encrypted or decrypted data to the execution environments 30. The modules 110, 112 are functional modules implemented by the processor 62 and the memory 64 (and the software 66, if used). Thus, reference to any of the modules 110, 112 performing or being configured to perform a function is shorthand for the processor 62 performing or being configured to perform the function (in accordance with the software 66, and/or firmware, as appropriate). Similarly, reference to the processor 62 performing a function is equivalent to the module 110 and/or the module 112 performing the function. To reduce complexity, not all of the execution environments 30 shown in FIG. 1 are shown in FIG. 5. Some communications are shown in FIG. 5 in dashed lines for an example that is discussed further below with respect to FIG. 6.

The memory module 110 is coupled to the execution environments 30 through a key bus 118 that may include a private key bus and/or a normal data bus. The key bus 118 is used to convey cryptographic keys to the crypto engine 12, with the key in this case including the key owner identifier and/or the authorized key user identifier(s) as appropriate. Thus, the memory module 110 is configured to obtain, e.g., receive, thus including means for obtaining (e.g., receiving), the cryptographic keys from the execution environments 30 via the key bus 118. The private key bus of the key bus 118 is configured such that the memory module 110 knows which execution environment 30 owns the key being received over a particular connection of the private key bus. There are multiple connections between the execution environments 30 and the memory module 110 over the private key bus, with a particular trusted connection assigned to each of the execution environments 30 such that the key module associates a key received over a particular connection of the private key bus with an associated or corresponding one of the execution environments 30. For keys received over the normal data bus, the memory module 110 may determine the key owner by an indication of the owner in the command including the key, or by identification information added to the message such as one or more bits that provide a machine identification. The memory module 110 is further configured to store, thus including means for storing, the cryptographic keys in the key storage 68, e.g., in the key table 70. The memory module 110 includes means for managing the keys, including managing the storage of the keys and access to or provision of the keys. The memory module 110 may determine whether a command for a particular key originates from a requesting execution environment 30 that is authorized for use of the particular key and authorize use of the particular key on behalf of the requesting execution environment 30 only if the requesting execution environment 30 is authorized for use of the particular key. For example, the memory module 110 may verify that the authorized key user identifier(s) 78 includes the requesting execution environment 30. The memory module 110 includes means for providing access to the keys by the processor module 112. The means for providing access to the keys may be means for sending or transmitting the keys to the processor module 112, and/or may be means for allowing the processor module 112 to access the key entries 72 in the key storage 68.

The processor module 112 is configured to obtain keys from the memory module 110, to obtain decryption commands from the execution environments 30, and to encrypt and decrypt data using one or more of the keys from the memory module 110 as appropriate. The processor module 112 implements an encryption module 114 and a decryption module 116. The encryption module 114 and the decryption module 116 are configured to transfer information securely from one of the execution environments 30 to one or more of the other execution environments 30. The processor module 112, and in particular the encryption module 114, is configured to receive or otherwise obtain encryption commands including indications of (e.g., memory locations of) information to be encrypted. The processor module 112, and in particular the decryption module 116, is configured to receive or otherwise obtain decryption commands including indications of (e.g., memory locations of) information to be decrypted. The encryption module 114 and/or the decryption module 116 may include a dedicated processor.

The encryption module 114 is configured to obtain unencrypted information from one (preferably any) of the execution environments 30, encrypt this information, and provide the encrypted information to one or more of the other execution environments 30 by storing the encrypted information in an intermediate storage location. The encryption module 114 is configured to obtain, e.g., receive or access, via a data bus 120, a command to encrypt plaintext, a destination or recipient execution environment for the information, and the location of the plaintext to be encrypted. Plaintext may be representative of text and/or non-text information such as pictures, video, etc. The command to encrypt plaintext may be a command to transfer information between one execution environment, the source execution environment, and one or more other execution environments, the destination or recipient execution environment(s). The encryption module 114 is configured respond to receiving the command to encrypt plaintext by obtaining, e.g., receiving or accessing, a cryptographic key from the memory module 110 (thus including means for obtaining, e.g., receiving or accessing the cryptographic key from the memory module 110). The cryptographic key obtained by the encryption module 114 will correspond to the cryptographic key stored in the key storage 68 that corresponds to the source (requesting) execution environment as the key author and the indicated destination or recipient execution environment from the encryption command as the authorized key user. That is, the obtained key will be the key that corresponds to the execution environment that sent the command and the execution environment or environments indicated as the destination or recipient of information to be transferred from the execution environment that sent the command. The encryption module 114 is further configured to obtain, e.g., receive or access, information to be encrypted, referred to as plaintext, from the execution environments 30, including means for obtaining, e.g., receiving or accessing, such information. For example, the encryption engine 114 may read the plaintext from a memory location associated with one of the execution environments 30. The encryption module 114 is further configured to encrypt the plaintext using the cryptographic key, e.g., using a well-known encryption technique such as applying a hash function. The encryption module 114 is further configured to provide (e.g., send, provide access to, make accessible, make available) the encrypted information, referred to as ciphertext, to the execution environments 30. Thus, the encryption module 114 includes means for providing (e.g., storing, sending, providing access to, making accessible, making available) the encrypted information to the execution environments 30. For example, the encryption engine 114 may store (write) the ciphertext into an intermediate storage location that is a memory location associated with one of the execution environments 30, e.g., associated with the destination execution environment or another execution environment that may act as an intermediary between the source and destination execution environments. The location to which the encryption engine 114 will write the ciphertext will correspond to the destination execution environment or an intermediary execution environment.

The decryption module 116 is configured to obtain ciphertext from one (preferably any) of the execution environments 30, decrypt the ciphertext to produce reconstituted plaintext, and to provide the reconstituted plaintext to the execution environment 30 that requested the decryption. The decryption module 116 is configured to receive, access, or otherwise obtain a decryption command from the execution environments 30. Thus, the decryption module 116 includes means for obtaining, e.g., receiving or accessing, the decryption command from the execution environments 30. For example, the decryption module 116 is configured to receive, via the data bus 120, a command to decrypt ciphertext, a source execution environment for the information, and the location of the ciphertext to be decrypted. The command to decrypt ciphertext may be a command to receive information from (and thus may include an indication of) the source execution environment. The command may indicate a particular key to be used, and/or the decryption module 116 may determine the key based on the sender of the command and the indicated source execution environment. The command may also indicate other destination execution environments for the information and the decryption module 116 is configured to determine the appropriate key to use based on the source execution environment and the set of destination execution environments. The decryption command may also include an indication of the location in memory of the ciphertext to be decrypted. Further, the decryption module 116 is configured to receive, access, or otherwise obtain the ciphertext, indicated by the decryption command, from the execution environments 30. Thus, the decryption module 116 includes means for obtaining, e.g., receiving or accessing, the ciphertext. The decryption module 116 may read the ciphertext from a memory location associated with the execution environment 30 requesting the decryption and identified in the decryption command. The decryption module 116 is configured to decrypt the ciphertext to produce reconstituted plaintext and to provide (e.g., provide access to, make accessible, make available, send) the reconstituted plaintext to the execution environment 30 that requested the decryption. Thus, the encryption module 116 includes means for providing (e.g., providing access to, making accessible, making available, sending) the reconstituted plaintext to one or more of the execution environments 30. For example, the decryption module 116 may write the reconstituted plaintext to a memory location associated with (e.g. owned by, controlled by, accessible to/by) the execution environment 30 that requested the decryption.

Figure 6:
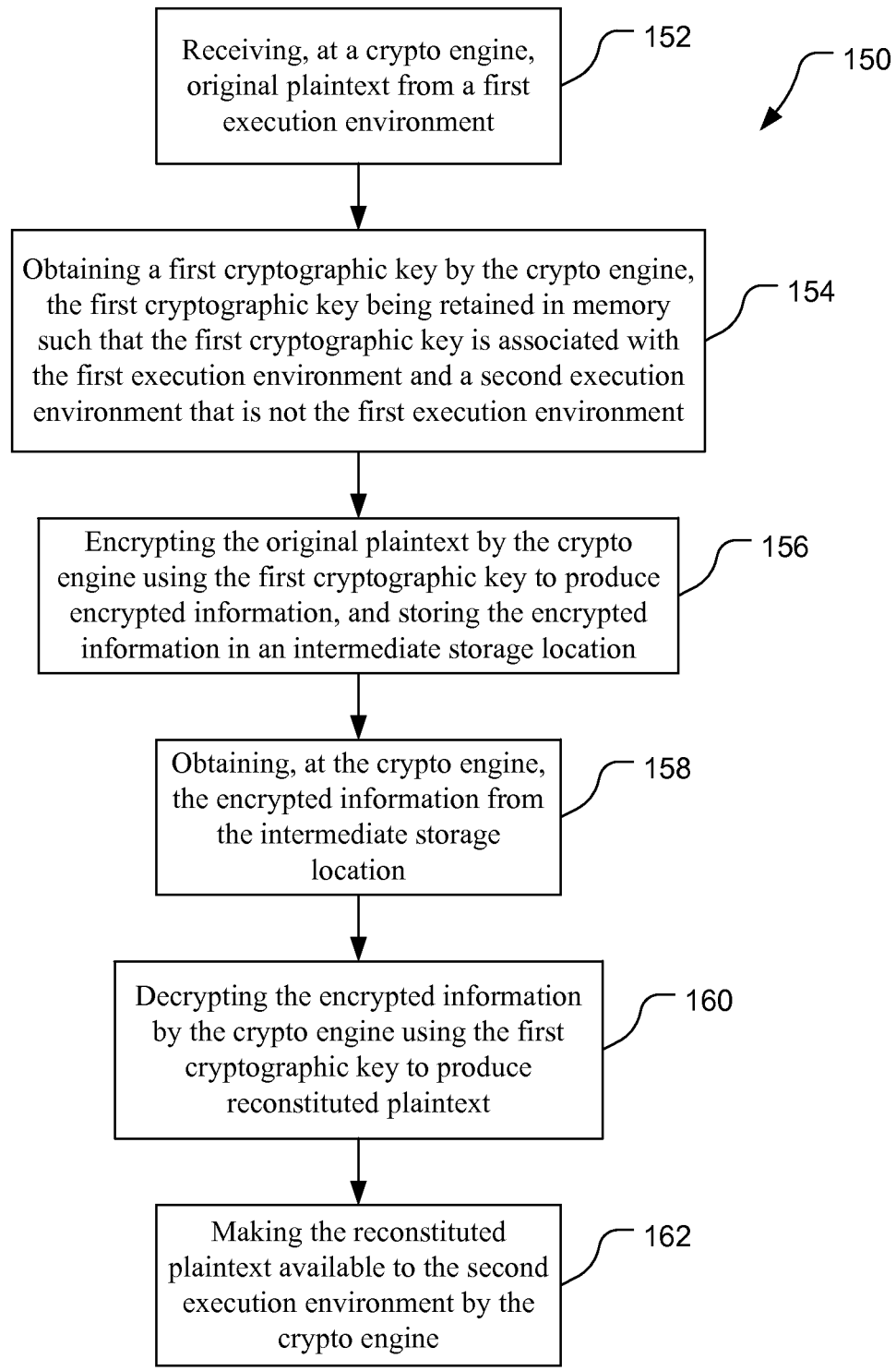
FIG. 6 is a block flow diagram of a process of securely transferring information between execution environments shown in FIG. 5.

Referring to FIG. 6, with further reference to FIGS. 1-5, a process 150 of securely transferring information between execution environments includes the stages shown. The process 150 is, however, an example only and not limiting. The process 150 can be altered, e.g., by having stages added, removed, rearranged, combined, performed concurrently, and/or having single stages split into multiple stages. To help illustrate the process 150, a specific example of secure transfer of information from the video execution environment 18 to the trust zone execution environment 24 via the HLOS execution environment 26 is discussed below. This example includes operations not shown in FIG. 6, with such operations not being required as part of the process 150. In this example, the video execution environment 18 will use a cryptographic key to encrypt plaintext to be sent to the trust zone execution environment 24, and the trust zone execution environment 24 will use the same cryptographic key to decrypt ciphertext back into the plaintext. The execution environments 18, 24 use the cryptographic key indirectly, with the cryptographic key being used directly by the encryption module 114 and the decryption module 116 on behalf of the execution environments 18, 24. The execution environments 18, 24 use the cryptographic key indirectly in the sense that the execution environments 18, 24 direct the modules 114, 116 to use the cryptographic key to encrypt plaintext and decrypt ciphertext. Also, the example discussed here is an example only, and not limiting of the system 10. Information may be sent between any of the execution environments 30, e.g., from the trust zone execution environment 24 to the video execution environment 18 or from any of the execution environments 30 to one or more of the other execution environments 30.

As part of the example of secure transfer from the video execution environment 18 to the trust zone execution environment 24, although an optional stage within the process 150 and not shown in FIG. 6, the video execution environment 18 may send a cryptographic key to the memory module 110 for use in providing a secure communication from the video execution environment 18 to the trust zone execution environment 24. The transfer of the cryptographic key from the video execution environment 18 to the memory module 110 is shown in FIG. 5 as a communication 130. The communication 130 may be communicated to the memory module 110 over the key bus 118. The communication 130 identifies the execution environment 30 providing the cryptographic key, e.g., by including a secure identifier or by being conveyed over a link, e.g., a private key bus of the key bus 118, that the memory module 110 trusts to provide information only from a predetermined execution environment, in this example the video execution environment 18. The communication 130 may include a usage indication of the destination execution environment 30, here the trust zone execution environment 24. The usage indication indicates that the associated cryptographic key may be used in decrypting ciphertext from the indicated destination execution environment if the source of the ciphertext is the execution environment 30 providing the communication 130. The source of the communication 130 may be determined by the link over which the communication 130 is received, or by the usage indication including an indication of the source execution environment 30 corresponding to the conveyed cryptographic key, or by another means. The cryptographic key source may be indicated in, or derivable from, the content of the communication 130 or the delivery means of the communication 130, and one or more authorized destination execution environments may be indicated in the usage indication. Where there are multiple destination execution environments 30 that may use the cryptographic key, the indications of the multiple destination execution environments 30 may be considered different usage indications, even if the indications of the different execution environments 30 are conveyed in a single communication 130. In response to the cryptographic key being sent by the video execution environment 18, the crypto engine 12, in particular the memory module 110, receives and stores the cryptographic key by writing the cryptographic key to a memory of the memory module 110. The memory module 110 stores the cryptographic key in association with the source of the key, here the video execution environment 18, and the destination for communications using the key, here the trust zone execution environment 24. For example, the memory module 110 may store the key in the key table 70, with the cryptographic key 74 forming a portion of a cryptographic key entry 72, and being stored along with indications of the source encryption environment, here the video execution environment 18, and the destination encryption environment, here the trust zone execution environment 24. The communication 130 may occur before, concurrently with, or after a communication 132 discussed below.

Another part of the example that is not shown in FIG. 6 is a communication 132 from the video execution environment 18 to the processor module 112, and in particular the encryption module 114, with a command to encrypt plaintext. The communication 132 may be conveyed over the data bus 120, in particular over a link of the data bus 120 that the crypto engine 12, and in particular the encryption module 114, trusts conveys commands only from a particular execution environment, in this example the video execution environment 18. The communication 132 may include an indication of the destination execution environment, here the trust zone execution environment 24.

At stage 152, the process 150 includes receiving, at a crypto engine, original plaintext from a first execution environment. The crypto engine 12 receives original plaintext for transmission to a destination execution environment from a source execution environment. For the example of secure transfer between the video execution environment 18 to the trust zone execution environment 24, as shown in FIG. 5, the encryption module 114 receives the original plaintext (0-PT) from the video execution environment 18 through a communication 134. The encryption module 114 may receive the original plaintext by accessing a memory location in the video execution environment 18, e.g., in a portion of the memory 54 to which the video execution environment 18 may write information. In particular, the encryption module 114 will access a memory location in the video execution environment 18 corresponding to the trust zone execution environment 24 as a destination execution environment, e.g., as indicated in the communication 132 if the communication 132 was used. The encryption module 114 reads the original plaintext from this memory location.

At stage 154, the process 150 includes obtaining a first cryptographic key by the crypto engine, the first cryptographic key being retained in memory such that the first cryptographic key is associated with the first execution environment and a second execution environment that is not the first execution environment. The memory module 110 provides a cryptographic key to the processor module 112, and the processor module 112 obtains, e.g., receives or accesses, the cryptographic key from the memory module 110. The obtaining of the cryptographic key may comprise the encryption module 114 reading the cryptographic key from the key storage 68 portion of the memory module 110. Continuing the illustrative example, the encryption engine 114 obtains a cryptographic key CKV-TZ from the memory module 110 in a communication 136. The cryptographic key CKV-TZ is the cryptographic key (EK) provided by the video (V) execution environment 18 for use in encrypting and decrypting communications from the video execution environment 18 to the trust zone (TZ) execution environment 24.

At stage 156, the process 150 includes encrypting the original plaintext using the crypto engine using the first cryptographic key to produce encrypted information (ciphertext), and storing the encrypted information in an intermediate storage location. The encryption module 114 uses the cryptographic key in accordance with any of a variety of encryption techniques to convert the plaintext into ciphertext (i.e., encrypt the plaintext) and store the ciphertext in an intermediate storage location. The intermediate storage location is the location in memory where the ciphertext is stored and is intermediate in the sense that it stores the ciphertext before being decrypted (thus storing information after encryption and before decryption). The intermediate storage location is not necessarily a designated location, or one of several locations designated, for storing ciphertext, and may not be solely for intermediate storage, that is, the ciphertext may be provided to or accessed by an entity that does not decrypt the ciphertext. Continuing the illustrative example, the encryption module 114 encrypts the plaintext into ciphertext and provides the ciphertext (CT) to the HLOS execution environment 26 in a communication 138, although this communication is optional and other mechanisms for providing this information may be used. For example, the encryption module 114 writes the ciphertext to a memory location of the HLOS execution environment 26, e.g., along with an indication that the ciphertext is a message from the video execution environment 18 intended for the trust zone execution environment 24. Alternatively, the ciphertext may be written to a portion of memory associated with the intended destination execution environment.

Yet another part of the illustrative example that is not shown in FIG. 6 is that the intermediary execution environment 30, if used, may provide the ciphertext to the destination execution environment 30. In this example, the HLOS execution environment 26 provides the ciphertext to the trust zone execution environment 24 in a communication 140. For example, the HLOS execution environment 26 may transfer the ciphertext from the memory location written to by the encryption module 114 into a memory location of the trust zone execution environment 24. Alternatively, the trust zone execution environment 24 reads the ciphertext stored in the HLOS execution environment 26 into a memory location of the trust zone execution environment 24.

Alternatively, the intermediary execution environment 30 may not provide the ciphertext to the destination execution environment 30. For example, the ciphertext may be read by the processor module 112 from the intermediary execution environment 30 for decrypting.

Yet another part of the illustrative example that is not shown in FIG. 6 is the destination execution environment 30 requesting decryption of the ciphertext. As shown in FIG. 5, the trust zone execution environment 24, which is the destination execution environment in this example, sends a communication 142 to the processor module 112, in particular the decryption module 116. The communication 142 requests decryption of the ciphertext, and may include indications of the source execution environment and the location in memory (e.g., of either the requesting execution environment 30 or the intermediate execution environment 30) where the ciphertext to be decrypted may be found (in this example, either the trust zone execution environment 24 or the HLOS execution environment 26). The communication 142 may include an indication of the requesting execution environment 30, here the trust zone execution environment 24, however, this indication may be omitted if the processor module 112 receives the communication 142 over a link of the data bus 120 that the processor module 112 trusts includes only information from a predetermined execution environment, here the trust zone execution environment 24. That is, the decryption module 116 knows from which execution environment 30 the communication 142 comes based on the link of the data bus 120 providing the communication 142 (i.e., over which the communication 142 is received). Further, the communication 142 includes a source indication indicating the source of the plaintext resulting in the ciphertext being requested to be decrypted, and thus the (indirect) source of the ciphertext.

At stage 158, the process 150 includes obtaining, at the crypto engine 12, the encrypted information. The encrypted information may be obtained, e.g., received or accessed, from the second execution environment 30 (e.g., via a communication 144 shown in FIG. 5 in the example) if the encrypted information was transferred to the second execution environment 30, or may be received from the intermediate execution environment 30 (e.g., via a communication 145 shown in FIG. 5 in the example). The processor module 112, and in particular the decryption module 116, obtains the ciphertext for decryption and provision to the destination execution environment 30. Continuing the illustrative example, the decryption module 116 obtains, via the communication 144, the ciphertext from the trust zone execution environment 24 that was read from the HLOS execution environment 26, or from the HLOS execution environment 26, via the communication 145, if the ciphertext was not read from the HLOS execution environment 26. The decryption module 116 may obtain this information by reading the memory location containing the ciphertext, e.g., as indicated by the communication 142 if the communication 142 was used.

At stage 160, the process 150 includes decrypting the encrypted information from the crypto engine using the first cryptographic key to produce reconstituted plaintext. The processor module 112, in particular the decryption module 116, obtains the cryptographic key in a communication 146 for decrypting ciphertext provided by the source execution environment 30 and authorized for delivery to the destination execution environment 30, here the first cryptographic key. The decryption module 116 accesses the memory module 110 to obtain the appropriate cryptographic key. Continuing the example, and with the communication 142 having been used, the decryption module 116 accesses and reads from the memory module 110 the cryptographic key indicated by the communication 142, that is, accesses and reads (or requests and is provided) the cryptographic key stored in association with the source execution environment 30 indicated by the communication 142 and the destination execution environment 30 associated with the communication 142, e.g., indicated by the communication 142 and/or associated with the link over which the communication 142 was received. Having obtained the appropriate cryptographic key, the decryption module 116 decrypts the encrypted information (i.e., the ciphertext) using the cryptographic key.

At stage 162, the process 150 includes making the reconstituted plaintext available to the second execution environment by the crypto engine. The processor module 112, and in particular the decryption module 116, of the crypto engine 12 makes the reconstituted plaintext available, for example by storing the reconstituted plaintext in the memory of the destination execution environment 30. Continuing the illustrative example, the decryption module 116 stores the reconstituted plaintext (R-PT) to the trust zone execution environment 24 using a communication 148.

Various additions, alterations, and/or deletions may be made to the process 150, and various implementations of the process 150 are possible. For example, the receiving or destination execution environment 30 may also be a source execution environment. Thus, in the illustration discussed above, the trust zone execution environment 24 may be a source execution environment 30 and the video execution environment 18 may be a destination execution environment for messages from the trust zone execution environment 24. As another example, execution environments 30 may authenticate each other using one or more execution keys and the crypto engine 12. As still another example, sets (e.g., pairs), of execution environments 30 that send messages to each other may use both cryptographic keys for each message sent from one of the execution environments 32 to the other execution environment 30. That is, each execution environment may store a cryptographic key for use in sending messages from itself to the other execution environment 30, and each message may be encrypted and decrypted using both the cryptographic key written by the sending execution environment and the cryptographic key written by the receiving execution environment. Further, the execution environments 30 may use the cryptographic keys to generate a common session to avoid double operations. Further still, multiple execution environments may use techniques discussed herein to generate communications between multiple execution environments. For example, a bulletin board may be implemented where execution environments share encrypted information. As another example, a virtual bus may be implemented where execution environments may multicast encrypted messages to encryption environments in a group.

Various implementations of the process 150 include execution environments that are to exchange messages by each writing a cryptographic key to the crypto engine 12. For example, a first execution environment and a second execution environment may exchange messages. In addition to the crypto engine 12 receiving a first cryptographic key from the first execution environment, and possibly a first usage indication indicating that the first cryptographic key may be used by the second execution environment, an implementation of the process 150 may include receiving a second cryptographic key from the second execution environment at the crypto engine 12 over a link that the crypto engine 12 trusts to provide information only from the second execution environment. The implementation may further include receiving a second usage indication from the second execution environment at the crypto engine 12 indicating that the second cryptographic key may be used in decrypting ciphertext from the first execution environment. The crypto engine 12 may write the second cryptographic key to memory. The process may further include using the first and second cryptographic keys for at least one of: authenticating each of the first and second execution environments by the other of the first and second execution environments, or generating a common session key. Authenticating the second execution environment by the first execution environment may comprise: receiving a first plaintext authenticator at the crypto engine 12 from the first execution environment, encrypting the first plaintext authenticator using the first cryptographic key to produce a first ciphertext authenticator, receiving the first ciphertext authenticator from the second execution environment, decrypting the first ciphertext authenticator using the first cryptographic key to produce a first reconstituted plaintext authenticator, encrypting the first reconstituted plaintext authenticator using the second cryptographic key to produce a second ciphertext authenticator, receiving a second ciphertext authenticator from the first execution environment, decrypting the second ciphertext authenticator using the second cryptographic key to produce a second reconstituted plaintext authenticator, and making the second reconstituted plaintext authenticator available to the first execution environment. The second execution environment may be authenticated if the second reconstituted plaintext authenticator matches the first plaintext authenticator. The first plaintext authenticator may be a random number, e.g., generated by the first execution environment. The first execution environment may be authenticated by the second execution environment and a similar manner.

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A alone, or B alone, or C alone, or AB, or AC, or BC, or ABC (i.e., A and B and C), or combinations with more than one of the same feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include that the information is conveyed from a sending entity but does not reach an intended recipient of the information. The intended recipient, even though not actually receiving the information, may still be referred to as a receiving entity, e.g., a receiving execution environment.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method of securely transferring information between execution environments, the method comprising:
receiving, at a crypto engine, original plaintext from a first execution environment;
obtaining a first cryptographic key by the crypto engine, the first cryptographic key being retained in memory such that the first cryptographic key is associated with the first execution environment and a second execution environment that is not the first execution environment, each of the first execution environment and the second execution environment being a virtual machine configured to process information;

encrypting the original plaintext by the crypto engine using the first cryptographic key to produce encrypted information, and storing the encrypted information in an intermediate storage location;

obtaining, at the crypto engine, the encrypted information from the intermediate storage location;

decrypting the encrypted information by the crypto engine using the first cryptographic key to produce reconstituted plaintext; and making the reconstituted plaintext available to the second execution environment by the crypto engine.

2. The method of claim 1, further comprising:

receiving, from the first execution environment by the crypto engine, a destination indication associated with the plaintext, the destination indication indicating the second execution environment; and receiving, from the second execution environment by the crypto engine, a source indication associated with the encrypted information, the source indication indicating the first execution environment.

3. The method of claim 1, further comprising:

receiving the first cryptographic key from the first execution environment at the crypto engine;

receiving a first usage indication from the first execution environment at the crypto engine indicating that the first cryptographic key may be used in decrypting ciphertext from the second execution environment; and writing the first cryptographic key to the memory by the crypto engine.

4. The method of claim 3, wherein the first usage indication indicates that the first cryptographic key may be used in decrypting ciphertext from the second execution environment if a source of the ciphertext is the first execution environment.

5. The method of claim 3, wherein the writing comprises writing the first cryptographic key into the memory with a first indication of the first execution environment and a second indication of the second execution environment.

6. The method of claim 5, further comprising receiving another usage indication from the first execution environment at the crypto engine indicating that the first cryptographic key may be used in decrypting ciphertext from a third execution environment, wherein the third execution environment is not the first execution environment or the second execution environment, and wherein the writing comprises writing the first cryptographic key with a third indication of the third execution environment.

7. The method of claim 3, wherein receiving the first cryptographic key from the first execution environment at the crypto engine comprising receiving the first cryptographic key over a link that the crypto engine trusts to provide information only from the first execution environment.

8. The method of claim 3, further comprising:

receiving a second cryptographic key from the second execution environment at the crypto engine;

receiving a second usage indication from the second execution environment at the crypto engine indicating that the second cryptographic key may be used in decrypting ciphertext from the first execution environment;

writing the second cryptographic key to the memory by the crypto engine; and using the first and second cryptographic keys for at least one of:

authenticating each of the first and second execution environments by the other of the first and second execution environments; or generating a common session key.

9. The method of claim 8, wherein the using comprises authenticating each of the first and second execution environments, and wherein authenticating the second execution environment by the first execution environment comprises:

receiving a first plaintext authenticator at the crypto engine from the first execution environment;

encrypting, by the crypto engine, the first plaintext authenticator using the first cryptographic key to produce a first ciphertext authenticator;

receiving, at the crypto engine, the first ciphertext authenticator from the second execution environment;

decrypting, at the crypto engine, the first ciphertext authenticator using the first cryptographic key to produce a first reconstituted plaintext authenticator;

encrypting, at the crypto engine, the first reconstituted plaintext authenticator using the second cryptographic key to produce a second ciphertext authenticator;

receiving, at the crypto engine, the second ciphertext authenticator from the first execution environment;

decrypting, at the crypto engine, the second ciphertext authenticator using the second cryptographic key to produce a second reconstituted plaintext authenticator; and making the second reconstituted plaintext authenticator available to the first execution environment by the crypto engine.

10. The method of claim 9, further comprising generating a random number and using the random number as the first plaintext authenticator.

11. The method of claim 1, further comprising:

receiving the first cryptographic key from the first execution environment at the crypto engine; and receiving a second cryptographic key from the second execution environment at the crypto engine;

wherein encrypting the original plaintext by the crypto engine includes using the first cryptographic key and the second cryptographic key to produce the encrypted information.

12. The method of claim 1, wherein obtaining, at the crypto engine, the encrypted information from the intermediate storage location comprises obtaining the encrypted information from the intermediate storage location via the second execution environment.

13. A crypto engine comprising:

a memory module; and a processor module communicatively coupled to the memory module and configured to:

receive original plaintext from a first execution environment;

obtain a first cryptographic key from the memory module, the first cryptographic key being stored by the memory module such that the first cryptographic key is associated with the first execution environment and a second execution environment that is not the first execution environment, each of the first execution environment and the second execution environment being a virtual machine configured to process information;

encrypt the original plaintext using the first cryptographic key to produce encrypted information and store the encrypted information in an intermediate storage location;

obtain the encrypted information from the intermediate storage location;

decrypt the encrypted information using the first cryptographic key to produce reconstituted plaintext; and make the reconstituted plaintext available to the second execution environment.

14. The crypto engine of claim 13, wherein the processor module is further configured to:

receive, from the first execution environment, a destination indication associated with the plaintext, the destination indication indicating the second execution environment; and receive, from the second execution environment, a source indication associated with the encrypted information, the source indication indicating the first execution environment;

wherein the processor module is configured to encrypt the original plaintext using the first cryptographic key based on receiving the destination indication indicating the second execution environment; and wherein the processor module is configured to decrypt the encrypted information using the first cryptographic key based on receiving the source indication indicating the first execution environment.

15. The crypto engine of claim 13, wherein the processor module is further configured to:

receive the first cryptographic key from the first execution environment at a first port that the processor module associates with the first execution environment;

receive a first usage indication from the first execution environment indicating that the first cryptographic key may be used in decrypting ciphertext from the second execution environment; and store the first cryptographic key in the memory such that the first cryptographic key is associated with the first execution environment and the second execution environment based on receiving the first cryptographic key and the first usage indication.

16. The crypto engine of claim 15, wherein the processor module is configured to store the first cryptographic key in the memory with a first indication of the first execution environment and a second indication of the second execution environment.

17. The crypto engine of claim 16, wherein the processor module is further configured to receive another usage indication from the first execution environment at the crypto engine indicating that the first cryptographic key may be used in decrypting ciphertext from a third execution environment, wherein the third execution environment is not the first execution environment or the second execution environment, and wherein the processor module is further configured to store the first cryptographic key with a third indication of the third execution environment.

18. The crypto engine of claim 15, wherein the processor module is further configured to:

receive a second cryptographic key from the second execution environment at a second port that the processor module associates with the second execution environment;

receive a second usage indication from the second execution environment indicating that the second cryptographic key may be used in decrypting ciphertext from the first execution environment; and store the second cryptographic key in the memory in association with the second usage indication.

19. The crypto engine of claim 13, wherein the processor module is further configured to:

receive the first cryptographic key from the first execution environment;

encrypt the original plaintext using the first cryptographic key and the second cryptographic key to produce the encrypted information.

20. A crypto engine comprising:

means for receiving original plaintext from a first execution environment;

first obtaining means for obtaining a first cryptographic key from memory, the first cryptographic key being associated with the first execution environment and a second execution environment that is not the first execution environment, each of the first execution environment and the second execution environment being a virtual machine configured to process information;

means for encrypting the original plaintext using the first cryptographic key to produce encrypted information and for storing the encrypted information in an intermediate storage location;

second obtaining means for obtaining the encrypted information from the intermediate storage location;

means for decrypting the encrypted information using the first cryptographic key to produce reconstituted plaintext; and means for making the reconstituted plaintext available to the second execution environment.

21. The crypto engine of claim 20, wherein:

the means for receiving are further for receiving, from the first execution environment, a destination indication associated with the plaintext, the destination indication indicating the second execution environment;

the second means for obtaining are further for receiving, from the second execution environment, a source indication associated with the encrypted information, the source indication indicating the first execution environment;

the means for encrypting are for encrypting the original plaintext using the first cryptographic key based on receiving the destination indication indicating the second execution environment; and the means for decrypting are for decrypting the encrypted information using the first cryptographic key based on receiving the source indication indicating the first execution environment.

22. The crypto engine of claim 20, wherein the means for receiving are further for receiving the first cryptographic key from the first execution environment at a first port associated with the first execution environment and receiving a first usage indication from the first execution environment indicating that the first cryptographic key may be used in decrypting ciphertext from the second execution environment, the crypto engine further comprising means for storing the first cryptographic key in the memory such that the first cryptographic key is associated with the first execution environment and the second execution environment based on receiving the first cryptographic key and the first usage indication.

23. The crypto engine of claim 22, wherein the means for storing are configured to store the first cryptographic key in the memory with a first indication of the first execution environment and a second indication of the second execution environment.

24. The crypto engine of claim 23, wherein the means for receiving are further for receiving another usage indication from the first execution environment at the crypto engine indicating that the first cryptographic key may be used in decrypting ciphertext from a third execution environment, wherein the third execution environment is not the first execution environment or the second execution environment, and wherein the means for storing are configured to store the first cryptographic key with a third indication of the third execution environment.

25. The crypto engine of claim 22, wherein the second obtaining means are further for:
receiving a second cryptographic key from the second execution environment at a second port associated with the second execution environment; and
receiving a second usage indication from the second execution environment indicating that the second cryptographic key may be used in decrypting ciphertext from the first execution environment; and
wherein the means for storing are further for storing the second cryptographic key in the memory in association with the second usage indication.

26. A non-transitory processor-readable storage medium comprising processor-readable instructions configured to cause a processor to:
receive original plaintext from a first execution environment;
obtain a first cryptographic key from memory, the first cryptographic key being associated with the first execution environment and a second execution environment that is not the first execution environment, each of the first execution environment and the second execution environment being a virtual machine configured to process information;
encrypt the original plaintext using the first cryptographic key to produce encrypted information and store the encrypted information in an intermediate storage location;
obtain the encrypted information from the intermediate storage location;
decrypt the encrypted information using the first cryptographic key to produce reconstituted plaintext; and
make the reconstituted plaintext available to the second execution environment.

27. The storage medium of claim 26, further comprising instructions configured to cause the processor to:
receive, from the first execution environment, a destination indication associated with the plaintext, the destination indication indicating the second execution environment; and
receive, from the second execution environment, a source indication associated with the encrypted information, the source indication indicating the first execution environment;
wherein the instructions configured to cause the processor to encrypt are configured to cause the processor to encrypt the original plaintext using the first cryptographic key based on receiving the destination indication indicating the second execution environment; and
wherein the instructions configured to cause the processor to decrypt are configured to cause the processor to decrypt the encrypted information using the first cryptographic key based on receiving the source indication indicating the first execution environment.

28. The storage medium of claim 26, further comprising instructions for causing the processor to:
receive the first cryptographic key from the first execution environment;
receive a first usage indication from the first execution environment indicating that the first cryptographic key may be used in decrypting ciphertext from the second execution environment; and
store the first cryptographic key in the memory such that the first cryptographic key is associated with the first execution environment and the second execution environment based on receiving the first cryptographic key and the first usage indication.

29. The storage medium of claim 28, wherein the instructions configured to cause the processor to store are configured to cause the processor to store the first cryptographic key in the memory with a first indication of the first execution environment and a second indication of the second execution environment.

30. The storage medium of claim 29, further comprising instructions configured to cause the processor to receive another usage indication from the first execution environment at the crypto engine indicating that the first cryptographic key may be used in decrypting ciphertext from a third execution environment, wherein the third execution environment is not the first execution environment or the second execution environment, wherein the instructions configured to cause the processor to store are configured to cause the processor to store the first cryptographic key with a third indication of the third execution environment.

31. The storage medium of claim 28, further comprising instructions configured to cause the processor to:
receive a second cryptographic key from the second execution environment;
receive a second usage indication from the second execution environment indicating that the second cryptographic key may be used in decrypting ciphertext from the first execution environment; and
store the second cryptographic key in the memory with indications that the second cryptographic key may be used to encrypt plaintext from the second execution environment and that the second cryptographic key may be used to decrypt ciphertext from the first execution environment.

* * * * *